Dec. 6, 1927.
L. BURMESTER ET AL
1,651,668
AIR HEATING FURNACE
Filed June 11, 1927  2 Sheets-Sheet 1
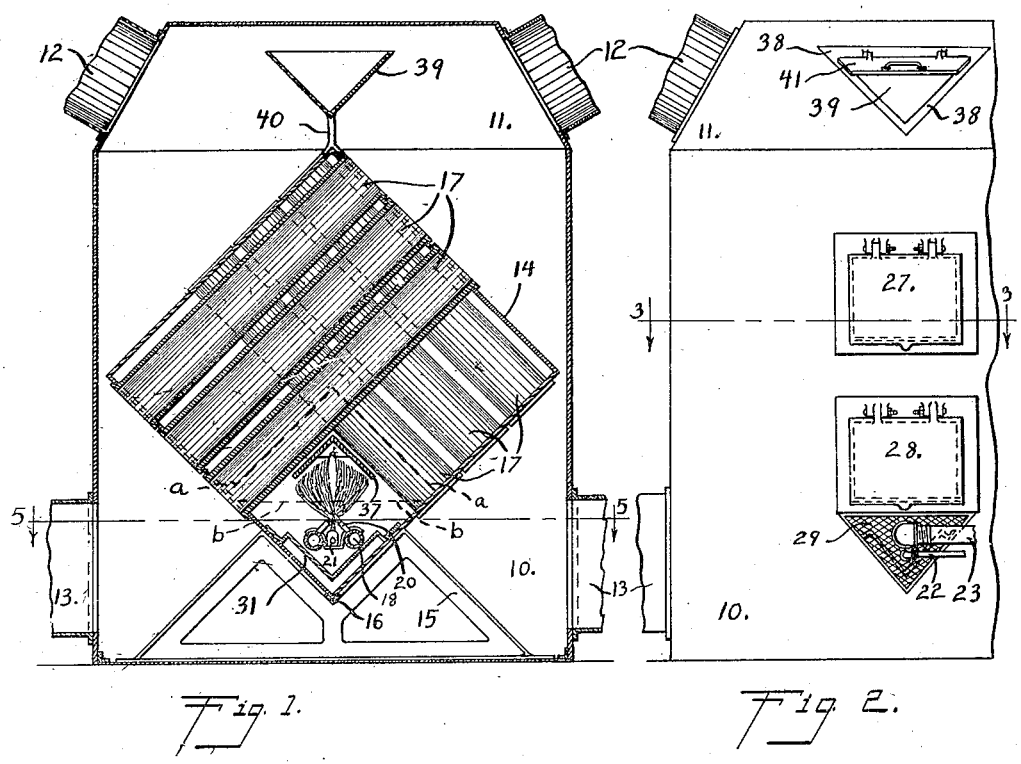
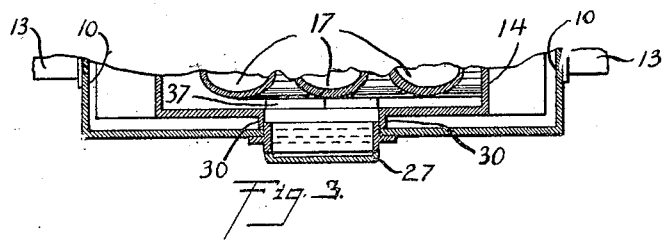
Inventors
L. BURMESTER
& A. MUNROE.
By David O. Barnell
Attorney

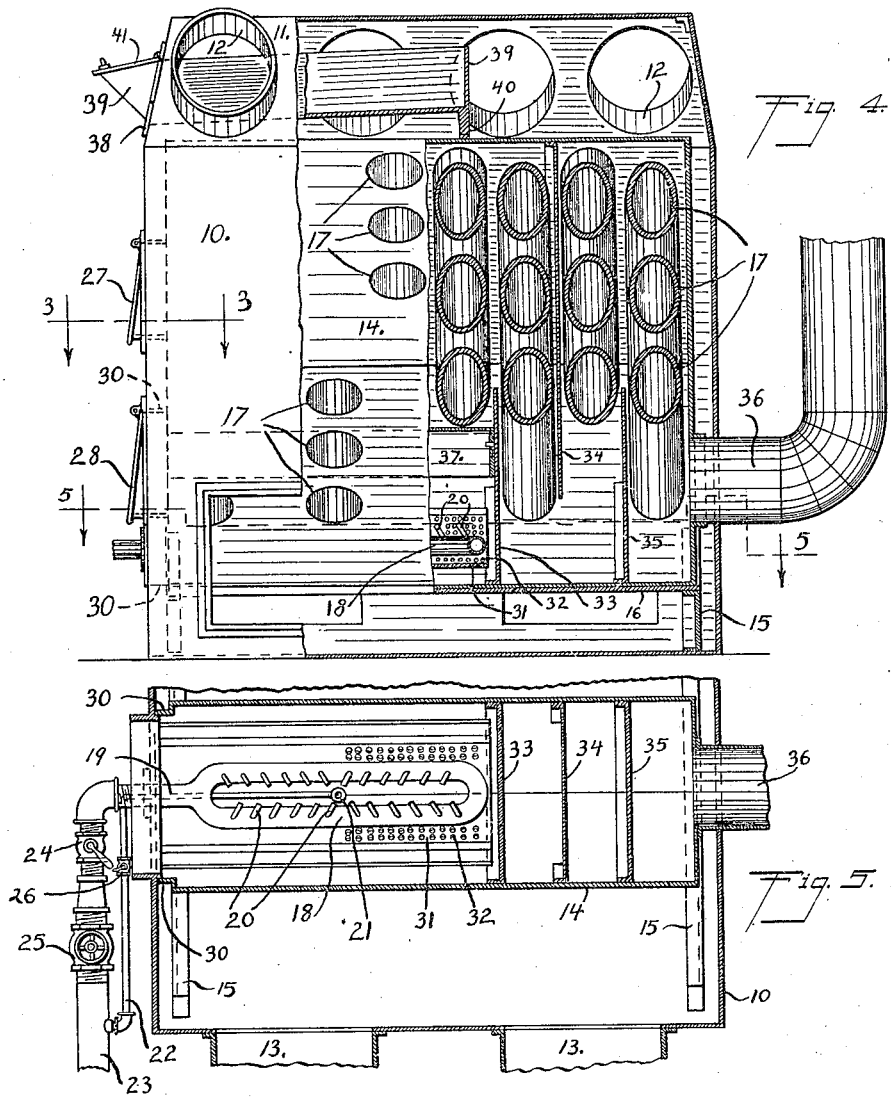

Patented Dec. 6, 1927.

1,651,668

UNITED STATES PATENT OFFICE.

LOUIS BURMESTER AND ALEXANDER MUNROE, OF OMAHA, NEBRASKA.

AIR-HEATING FURNACE.

Application filed June 11, 1927. Serial No. 198,288.

Our invention relates to air-heating furnaces suitable for use in heating dwellings and the like, and wherein the heated air is conveyed to a plurality of points by suitable conduits, a circulation of air through the furnace being maintained by supplying thereto cool air, either by return from the space to which the heated air is delivered or from other sources, or both. It is the object of our invention to provide a furnace of this general type particularly adapted for use with gaseous fuel, such as the ordinary city gas commonly supplied for domestic use. A further object of our invention is to provide a furnace constructed substantially throughout from sheet-metal, which may be readily fabricated by means of the tools and appliances forming the usual equipment of sheet-metal and tin shops. A further object of our invention is to provide a durable and efficient furnace structure which may be produced at a moderate cost, and of which the fabricated parts may be of such form and dimensions as to enable them to be taken into a dwelling through the ordinary doors thereof, so that the furnace may be readily erected within a building after the same is completed. A further object of our invention is to provide a furnace especially adapted for automatic thermostatic control by throttling of the fuel supply, and wherein the temperature of the heated air output will be promptly responsive to the variations of the fuel supply. A further object is to provide a simple and efficient means for humidifying the heated air output from the furnace. A further object of our invention is to provide an efficient gas-burner for the furnace by insuring a suitable supply of air to the burner for the proper maintenance of combustion of the fuel, without such excess of air as to unduly cool the combustion products, and to provide means for securing a proper circulation of the hot combustion products across radiating surfaces of ample area to secure a maximum transfer of heat therefrom to the air output from the furnace.

In the accompanying drawings Fig. 1 is a vertical transverse section of a furnace embodying our invention, Fig. 2 is a partial front elevation of the same, Fig. 3 is a partial horizontal section on the line 3—3 of Figs. 2 and 4, Fig. 4 is a partial side elevation and partial longitudinal vertical section, and Fig. 5 is a partial horizontal section on the line 5—5 of Figs. 1 and 4.

In carrying out our invention according to the illustrated embodiment thereof we provide a substantially rectangular housing 10 of sheet metal, having a short frustopyramidal upper portion 11, at the sides of which are the thimbles 12 for connection with the distributing pipes for the heated air. At the sides of the housing 10 near the bottom thereof are rectangular openings for communication with the inlet or cold-air pipes 13. Within the housing 10 is disposed the furnace-body 14 which is a right parallelepipedal shell or casing made of sheet metal and arranged cornerwise vertically. The casing or shell 14 is supported at its front and rear ends upon V-frames 15, said frames being connected with each other by an angle-bar 16 extending longitudinally beneath the lower corner of the shell 14. The lateral corners of the shell are slightly spaced from the sides of the housing 10, and the front and rear ends of the shell are likewise spaced from the front and rear ends of the housing, as shown. Within the intermediate and upper portions of the shell, and traversing the same between the opposite inclined sides thereof, are a plurality of sheet-metal tubes or flues 17, the same being respectively parallel with the other sides of the shell. Said flues 17 are arranged in superposed series, and the successive series are alternately inclined, or so that each series which starts at the lower right side of the shell and terminates at the upper left side of the shell is adjacent to or interposed between series starting at the lower left side of the shell and terminating at the upper right side of the shell. The arrangement of the flues to traverse only the intermediate and upper portions of the shell, leaves an open or unobstructed space adjacent to the lower corner of the shell, extending substantially from end to end thereof, and in the front portion of said space is disposed the burner 18. In the illustrated structure the burner is adapted for use with gaseous fuel, and comprises parallel tubular side portions connected at their rear ends to form a continuous loops, and connecting at their front ends with the Y-stem 19. Jet-tubes 20 at the upper sides of the burner-pipes are inclined toward each other, so that the gas currents issuing from said jets will impinge upon each other and be thereby spread to form flattened flame-zones. At approximately the middle of the burner is disposed a pilot light 21, which is supplied with fuel through a small pipe 22 connected with the main supply pipe 23 ahead of the control-cock 24 and shut-off valve 25, the pilot-supply pipe 22 having a separate control-cock 26. Doors 27 and 28 are provided in the front of the housing 10, and beneath the lower door 28 there is a triangular opening which is covered by a screen 29; the shell 14 having at its front end portions 30 extended to connect with the housing at said doors and screened opening, and the pipes 19 and 22 passing through the screened opening to enter the lower portion of the shell, as shown. Air for supporting combustion of the fuel is admitted through the screen 29, passing therefrom directly to the front portion of the burner, and for the rear portion of the burner the air passing through a conduit formed by an angle-plate 31 disposed in the lower corner portion of the shell 14, the front end of said conduit being open to receive air at the screen 29 and the rear portion of the plate 31 having perforations 32 for allowing the air from the conduit to pass up to the burner. Directly adjacent to the rearward end of the burner and angle-plate 31, a vertical baffle-plate 33 is disposed transversely of the shell. Said plate 33 is longitudinally intermediate two series of the flues 17 and extends from the lower corner of the shell up to the centers of the lowermost flues of the series, the inclined upper edges a of the plate being parallel with the centers of said flues, as shown by the dotted lines in Fig. 1. Between the two series of flues 17 next rearward from the baffle-plate 33, a baffle-plate 34 is extended transversely across the upper portion of the shell, leaving a triangular opening below the lower edge of said plate, which is horizontal as indicated by the dotted line b in Fig. 1. Between the next two series of the flues 17 is disposed a baffle-plate 35 similar to the plate 33, and, if the length of the shell should be increased to accommodate additional series of the flues, additional baffle-plates should be employed, similar to the plates 33 and 34, and disposed alternately between the successive series of the flues. To the rear end of the shell 14 adjacent to the lower corner thereof is connected the stack or chimney-pipe 36, which is extended through the rear end of the housing 10, as shown. An angle-plate 37 is extended longitudinally from the front end of the shell 14 to the baffle-plate 33; said plate being arranged above the burner, slightly spaced from the lowermost of the flues 17, and being of substantially the proportions shown in Fig. 1. Said plate 37 serves as a baffle to spread laterally the hot combustion products rising from the burner, preventing excessive heating of the portions of the flues directly above the burner, and causing the gases to pass about the lower portions of the flues before flowing upward longitudinally thereof to the upper portion of the shell. The transverse baffle-plates 33, 34 and 35 cause respectively upward and downward deflections of the combustion products during the flow thereof from the upper front portion of the shell to the lower rearward portion at which the same escape through the pipe 36, so that substantially the entire area of the flues 17 is effectively utilized for the transfer of heat from the combustion products to the air which circulates through said flues from the lower to the upper portions of the space within the housing 10.

In the front of the upper portion 11 of the housing a triangular frame 38 is disposed about a similarly shaped opening, and through said opening extends a V-shaped water-trough or pan 39. The rear end of said pan is supported by a forked leg 40 which rests upon the upper corner of the shell 14. A short portion of the water-pan projects forwardly from the frame 38, and the top of said projecting portion of the pan is normally covered by a plate or door 41 which is hinged to the frame 38 so as to be readily openable for filling the pan with water. By the arrangement of the water-pan in the heated upper portion of the housing, evaporation therefrom is caused at a rate sufficient to properly humidify the heated air delivered to the distributing-pipes.

It will be seen that by the described construction we provide a furnace constructed substantially throughout from sheet-metal, which may be inexpensively fabricated in sheet-metal shops by the use of the ordinary tools and appliances used for such work. It will be seen also that the casing or shell 14 may be of such proportions that it may be taken through the doors of an ordinary dwelling, and that increase in the heating capacity of the furnace may be effected by increasing the length of the shell and the number of series of flues traversing the same, without increasing the transverse dimensions of the shell. It will be seen also that by the use of the thin-walled flues a maximum transfer of heat may be effected from the combustion products to the air circulating through the furnace-housing, and that variations of the fuel-supply will promptly cause a responsive variation of the heat supplied by the furnace to the distributing-pipes, whereby the furnace is especially well adapted for automatic thermostatic control by devices governing the fuel-supply thereto. The inclined arrangement of the flues 17, opening into the lower portions of the housed space and extending diagonally upward into the upper portions of said space, causes a rapid circulation of the air to be heated. The transverse baffle-plates cause an efficient circulation of the combustion products in the portion of the furnace-body rearward of the burner, and the horizontal baffle or angle-plate 37 insures efficient distribution of the circulation of hot gases about the flues positioned above the burner, while enabling the burner to be placed directly within the shell instead of being in a separate combustion-chamber.

Now, having described our invention, what we claim and desire to secure by Letters Patent is:

1. In an air-heating furnace, a furnace-body comprising a parallelepipedal shell disposed cornerwise vertically, flues traversing the intermediate and upper portions of said shell between the opposite inclined sides thereof, said flues being in superposed series and the alternate series being oppositely inclined, and heating means arranged within the lower longitudinal portion of said shell.

2. In an air-heating furnace, a furnace-body comprising a rectangular sheet metal shell disposed cornerwise vertically, sheet-metal flues traversing the upper and intermediate portions of said shell between the opposite inclined sides thereof, said flues being arranged in superposed series alternately oppositely inclined, and heating means extending longitudinally of the shell within the lower corner portion thereof.

3. In an air-heating furnace, a furnace-body comprising a right parallelepipedal shell of sheet metal, means for supporting the same in cornerwise vertical position, sheet-metal flues traversing the intermediate and upper portions of said shell between the opposite inclined sides thereof, said flues being arranged in superposed series and the alternate series being oppositely inclined, heating means extending longitudinally within the lower front portion of the shell, and vertical baffle-plates interposed between the series of flues rearwardly of the heating means and arranged to direct combustion products from the heating means alternately upward and downward during the flow thereof toward the rear end of the shell.

4. A structure as set forth in claim 3, including a baffle-plate disposed horizontally above the heating means and adapted to direct the combustion products laterally about the lower portions of the flues which extend above the heating means.

5. In an air-heating furnace, a furnace-body comprising a sheet-metal shell having a plurality of series of inclined superposed air-flues traversing the upper portions thereof, the successive series of flues being oppositely inclined, a gas burner extending longitudinally within the lower portion of said shell, the latter having an opening at the end for admitting air to support combustion of the fuel, and means forming a conduit receiving air from said opening and adapted to deliver the air therefrom to the portions of the burner remote from said opening.

6. In a structure as set forth in claim 5, a horizontal baffle-plate arranged above the burner and adapted to deflect the combustion products therefrom laterally about the lower portions of the adjacent air-flues.

7. In an air-heating furnace, a furnace-body comprising a right parallelepipedal shell of sheet-metal disposed cornerwise vertically, a housing inclosing said furnace-body and having air inlet and distributing pipes connected therewith respectively at the lower and upper portions thereof, sheet-metal air-flues traversing the upper portion of said shell between the opposite lower and upper inclined sides thereof, and heating means disposed within said shell adjacent to the lower corner portion thereof.

8. A structure as set forth in claim 7, in which the air-flues are arranged in a plurality of superposed series, the successive series being oppositely inclined, and transverse baffle-plates arranged between the series of flues and extending alternately from the lower and upper portions of the shell to intercept said portions longitudinally and direct the combustion products alternately upward and downward during the flow thereof longitudinally of the shell.

LOUIS BURMESTER.
ALEXANDER MUNROE.